Aug. 6, 1935.    W. B. LAIR    2,010,695
WELDING ELECTRODES
Filed Feb. 27, 1934
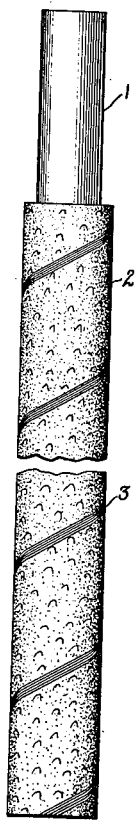
Inventor:
Walter B. Lair,
by Harry E. Dunham
His Attorney.

Patented Aug. 6, 1935

2,010,695

UNITED STATES PATENT OFFICE 2,010,695

WELDING ELECTRODES

Walter B. Lair, Scotia, N. Y., assignor to General Electric Company, a corporation of New York Application February 27, 1934, Serial No. 713,095

5 Claims. (Cl. 219—8)

My invention relates to electrodes for use in metallic arc welding.

In metallic arc welding, an arc is maintained between the work to be welded and a rod, wire, or strip of metal usually referred to as an electrode. During welding, the electrode is fused or vaporized or both and the metal thereof deposited upon and welded to the work as the electrode is fed toward the work to maintain the arc.

The quality of the weld metal deposited by such a process depends to a large extent upon the influence of certain elements or compounds associated with the electrode usually in the form of a coating. Electrodes so coated are commonly referred to as flux coated electrodes.

It is an object of my invention to provide an improved flux coated electrode.

It is a further object of my invention to provide an electrode particularly adapted for vertical and overhead welding which may, however, also be used for flat or horizontal welding.

Further objects of my invention will appear from the following description taken in connection with the accompanying drawing which illustrates one embodiment thereof.

The operating characteristics of an electrode in accordance with my invention is determined by the application thereto of a flux of substantially the following composition:

| | Parts by weight |
|---|---|
| Feldspar | 100 |
| Titanium dioxide | 100 |
| Ferromanganese | 8 |
| Sodium silicate (liquid) | 100 |
| Water | 47 |

Feldspar is an aluminum-bearing silicate. I prefer to employ a potassium feldspar and a ferromanganese of low carbon content; that is, of a carbon content less than 1.5%. Titanium dioxide is obtainable in titanium ores or as a commercial compound. The feldspar and titanium dioxide are ground to pass through a 300 mesh screen and the ferromanganese is ground to pass through a 200 mesh screen. The sodium silicate preferably has a specific gravity of 40° Baumé in which the ratio of $Na_2O$ to $SiO_2$ is approximately 1 to 3.25. The materials of the flux are mixed to form a smooth paste which is applied to the electrode.

By reason of the equal proportions of feldspar and titanium dioxide present in the flux of my electrode, the slag produced therefrom during welding is sufficiently fluid to readily cover the weld metal and protect it from the surrounding atmosphere. The flux is characterized by the small amount of sodium silicate employed. Only sufficient silicate is used to give a balance between a suitable deposit and a proper adherence of the flux to the core and tape of the electrode. By decreasing the sodium silicate, a less fluid deposit is obtained and it is possible to add ferromanganese as a deoxidizer without increasing the fluidity of the weld metal to such an extent as to render the electrode unsuitable for vertical or overhead welding. Generally, ferromanganese when added to an electrode, increases the fluidity of the weld metal and previous attempts to add ferromanganese to a vertical or overhead flux gave a deposited metal which was too fluid. The amount of ferromanganese that can be added to the flux is limited by the fluidity resulting from its addition and I have found that with a formula such as specified above, 10 parts of ferromangese will cause a deposit which is more fluid and difficult for the welder to handle than the 8 parts specified in this formula. Thus, although the proportions specified in my flux are subject to slight variation without departing from the spirit and scope of my invention, I prefer to employ a flux of the particular composition above specified.

I have shown the above flux paste applied to the electrode in conjunction with a tape of fibrous material, as described and claimed in application Serial No. 648,651, Joseph H. Humberstone, Welding electrodes, filed December 23, 1932, and assigned to the same assignee as the present case. When thus coated, the electrode comprises a metallic core 1 enclosed within a flux impregnated tape 2 folded longitudinally about the core with its edges abutting one another and parallel to the axis of the core. There may or may not be a substantial layer of flux material between the flux impregnated tape and the core of the electrode. In making heavy coated electrodes there is an advantage in having this coating of flux between the tape and the core of the electrode as it protects the tape from the action of the arc and facilitates the formation of a crater at the end of the electrode which has a confining action on the arc that greatly improves its operating characteristics, as well as the quality of the weld metal deposited thereby.

When using a tape of cellulosic material such as cotton, the total weight of the electrode coating is preferably about 10% of the weight of the core of the electrode. The proportions may, however, be widely varied without departing from my invention. The presence of cellulosic material though desirable is not absolutely necessary.

In the process of manufacturing the electrode, it has been found desirable to hold the folded tape to the core of the rod by means of a helical binding 3. This binding is made of a flat strip, the turns of which are spaced a substantial distance from one another, as illustrated in the drawing. By employing a flat strip the outside diameter of the electrode is not increased and the binding is less subject to destruction or removal from the electrode by reason of its engagement with foreign objects. Preferably the binding is made of a string formed of a plurality of untwisted strands of thread or vegetable fibre. The presence of this binding on the electrode is a distinct advantage since it prevents the coating from warping or separating from the electrode core as a result of the coating becoming damp or saturated with water which may readily occurs as a result of exposure to weather conditions. The binding when colored also serves to indicate the flux composition employed on the electrode.

The electrode illustrated in the drawing is a short length rod such as would usually be employed in hand welding operations. The upper end of the electrode has been bared of flux in order to adapt it for use in an electrode holder by means of which welding current is supplied thereto. Electrodes may be made in accordance with my invention in long lengths for use in automatic or semi-automatic machines by means of which the electrode is fed toward and away from the work to strike and thereafter maintain a welding arc by means of a mechanism which functions in response to a characteristic of the welding arc, such as its voltage or current. In such automatic machines the welding current may be supplied to the electrode through incisions made in the flux coating or through openings provided by removing a portion of the coating from the electrode.

An outstanding characteristic of my improved flux coated electrode is that it may be used on intricate welds in any position without producing an undercut weld; that is, a weld having a concavity at its juncture with the parent metal.

My improved flux coated electrode operates with a welding voltage of from 20 to 24 volts and is preferably used with straight polarity. It may, however, be used with reverse polarity and will operate satisfactorily when welding with alternating current.

The following results are obtained when welding steel boiler plate of fire-box quality with an electrode coated with my flux and having a core of substantially the following composition:

|  | Percent |
|---|---|
| Carbon | .13 to .18 |
| Manganese | .40 to .60 |
| Phosphorus maximum | .04 |
| Sulphur maximum | .04 |
| Silicon maximum | .025 |
| Iron—remainder | |

Welds made with such an electrode have an ultimate tensile strength of about 64,000 pounds per square inch and a yield point ranging from 40,000 to 50,000 pounds per square inch. The ductility of the weld metal when determined by the free-bend test is from 32 to 44 per cent, and under the Charpy impact test gives from 24 to 28 foot pounds.

The use of my flux, however, is not limited to electrodes having cores of low carbon steel. It may be used for depositing high carbon tool steels. For example, I have obtained a deposit giving a hardness of 38 on the Rockwell C scale when using a core of the following composition.

|  | Percent |
|---|---|
| Carbon | .90 to 1.00 |
| Silicon | .15 to .30 |
| Manganese | 1.20 to 1.40 |
| Sulphur maximum | .03 |
| Phosphorus maximum | .03 |
| Chromium | .43 to .57 |
| Tungsten | .43 to .57 |
| Vanadium | .08 to .12 |
| Iron—remainder | |

When welding with an electrode of the above composition, I prefer to use reversed polarity. The deposit may be further hardened by heat treatment. After heat treatment the deposit can be given a hardness of 60 on the Rockwell C scale.

What I claim as new and desire to secure by Letters Patent in the United States is:

1. A flux for use in arc welding comprising substantially equal parts by weight of feldspar, titanium dioxide, and liquid sodium silicate.

2. A flux for use in arc welding operations having substantially the following composition: feldspar 100 parts by weight, titanium dioxide 100 parts by weight, ferromanganese 8 parts by weight, and liquid sodium silicate 100 parts by weight.

3. A welding electrode having a covering resulting from impregnating a cellulosic material with a material of substantially the following composition: low carbon ferromanganese 8 parts by weight, feldspar 100 parts by weight, titanium dioxide 100 parts by weight, and liquid sodium silicate 100 parts by weight.

4. A welding electrode having the flux coating resulting from applying thereto a mixture of substantially equal parts by weight of a substance of the group containing aluminum-bearing and magnesium-bearing silicates, titanium ore and liquid sodium silicate.

5. A welding electrode having a flux coating resulting from applying thereto a mixture of substantially equal parts by weight of aluminum-bearing silicates, titanium dioxide, and liquid sodium silicate.

WALTER B. LAIR.